US010111060B2

United States Patent
Leung et al.

(10) Patent No.: US 10,111,060 B2
(45) Date of Patent: Oct. 23, 2018

(54) CLIENT APP SERVICE ON MOBILE NETWORK

(71) Applicants: Kent K. Leung, Palo Alto, CA (US); Jayaraman R. Iyer, San Jose, CA (US); Flemming S. Andreasen, Marlboro, NJ (US)

(72) Inventors: Kent K. Leung, Palo Alto, CA (US); Jayaraman R. Iyer, San Jose, CA (US); Flemming S. Andreasen, Marlboro, NJ (US)

(73) Assignee: Cisco Tecnology, Inc., San Jose, CA (US)

( * ) Notice: Subject to any disclaimer, the term of this patent is extended or adjusted under 35 U.S.C. 154(b) by 1131 days.

(21) Appl. No.: 13/916,292

(22) Filed: Jun. 12, 2013

(65) Prior Publication Data

US 2014/0372293 A1    Dec. 18, 2014

(51) Int. Cl.
*H04W 4/24*    (2018.01)
*H04L 12/14*    (2006.01)
*H04L 29/08*    (2006.01)

(52) U.S. Cl.
CPC .......... *H04W 4/24* (2013.01); *H04L 12/1435* (2013.01); *H04L 67/28* (2013.01); *H04L 67/10* (2013.01); *H04L 67/2842* (2013.01)

(58) Field of Classification Search
USPC .......................................... 709/224; 702/182
See application file for complete search history.

(56) References Cited

U.S. PATENT DOCUMENTS

| | | | |
|---|---|---|---|
| 6,968,175 B2 | 11/2005 | Raivisto et al. | |
| 7,058,691 B1 | 6/2006 | Yu et al. | |
| 7,284,035 B2 | 10/2007 | Yu et al. | |
| 7,995,506 B2 | 8/2011 | Kalish | |
| 8,011,002 B1 | 8/2011 | Upadhyay et al. | |
| 8,250,644 B1 | 8/2012 | Upadhyay et al. | |
| 2008/0205399 A1* | 8/2008 | Delesalle | H04L 29/12009 370/392 |
| 2013/0054378 A1* | 2/2013 | Hao | G06Q 30/0241 705/14.66 |
| 2014/0372293 A1* | 12/2014 | Leung | H04W 4/26 705/40 |

* cited by examiner

*Primary Examiner* — Tsan-Yu J Huang
(74) *Attorney, Agent, or Firm* — Baker Botts L.L.P.

(57) ABSTRACT

A system is disclosed for measuring data utilization attributable to use by an application being executed on a mobile device. The system has a server operable to register the application and transmit information to establish a connection between the application and a proxy server. The system also has a proxy server operable to establish a first connection with the application, receive direction to establish a second connection with a target endpoint, establish the second connection between the proxy server and the target endpoint, pass data between the target endpoint and the application using the established connections, and measure the amount of data passed between the target endpoint and the application.

18 Claims, 6 Drawing Sheets

CLIENT APP SERVICE ON MOBILE NETWORK

TECHNICAL FIELD

The present disclosure relates generally to applications on a mobile device receiving data over a mobile network.

BACKGROUND

Current network service providers charge users by the amount of data users consume. Current content providers are capable of providing content containing a large amount of data. Users on mobile networks may wish to view content on their mobile devices. In some cases these users may use an application on their mobile device to view content received through the mobile network. The content these users view using applications on their mobile devices may consume a large amount of data.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Overview

According to one aspect of the present disclosure, a system is disclosed for measuring data utilization attributable to use by an application being executed on a mobile device. The system has a server operable to register the application and transmit information to establish a connection between the application and a proxy server. The system also has a proxy server operable to establish a first connection with the application, receive direction to establish a second connection with a target endpoint, establish the second connection between the proxy server and the target endpoint, pass data between the target endpoint and the application using the established connections, and measure the amount of data passed between the target endpoint and the application.

According to another aspect of the present disclosure, a non-transitory computer-readable medium has stored thereon instructions that, when executed, cause the computer to receive a first data utilization by a device on a mobile network. The first data utilization is a total data utilization by the device. The computer-readable medium also has stored thereon instructions that, when executed, cause the computer to measure a second data utilization by the device on the mobile network. The second data utilization is a data utilization by an application running on the device. The computer-readable medium also has stored thereon additional instructions that, when executed, cause the computer to calculate an amount of a bill based at least in part on the first data utilization and the second data utilization.

Description of Example Embodiments

Embodiments of the present disclosure are best understood by referring to FIGS. 1 through 6 of the drawings, like numerals being used for like and corresponding parts of the various drawings.

Figure 1:
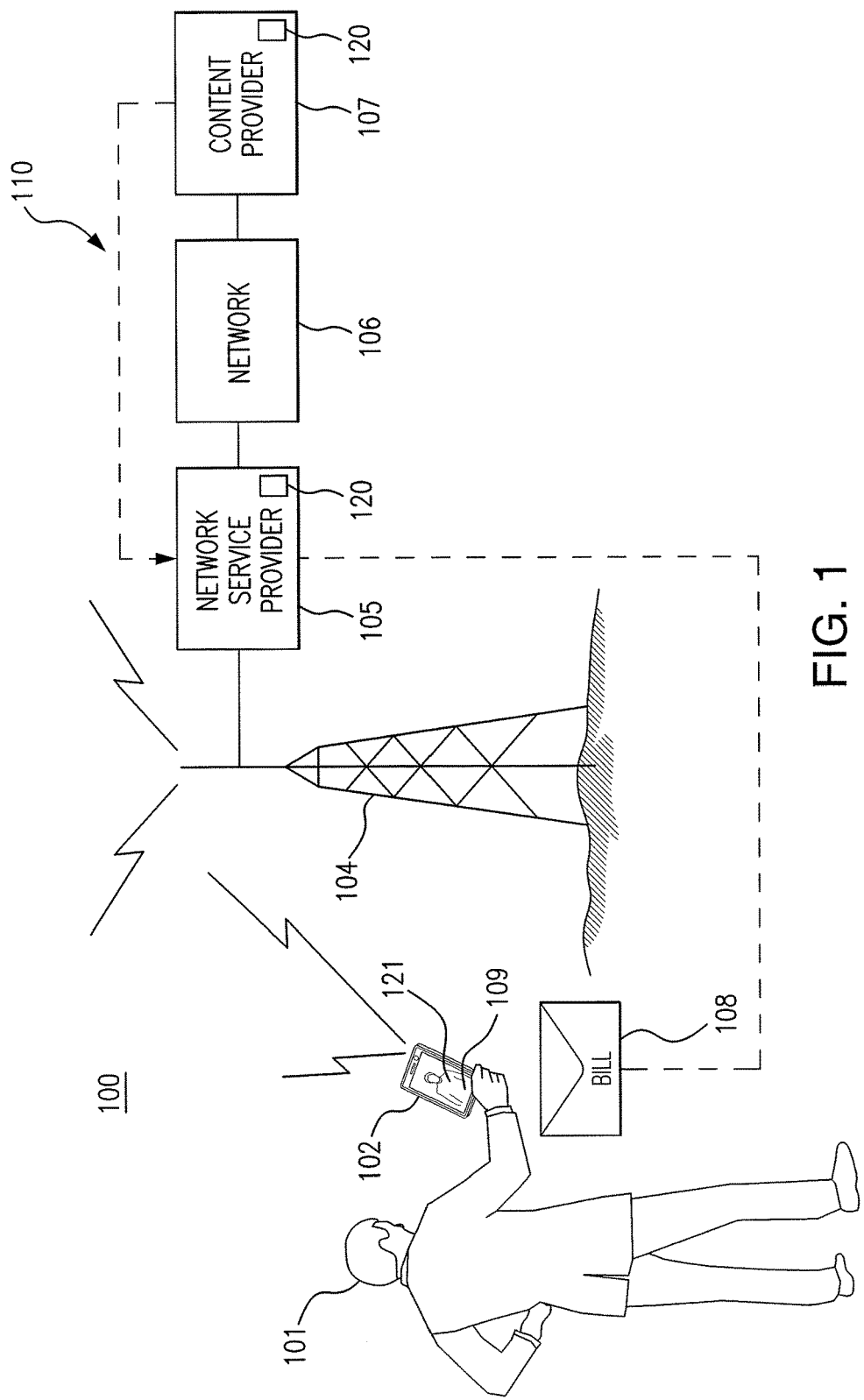
FIG. 1 illustrates an example system for receiving content through a mobile application.

FIG. 1 illustrates an example system 100 for receiving content through a mobile application. System 100 includes a mobile user 101, a mobile device 102, an application 121, a base station 104, a network service provider 105, a network 106, a content provider 107, and a bill 108. Network service provider 105 and content provider 107 may include one or more computer systems 120 of FIG. 6. Network service provider 105 may provide mobile user 101 with access to network 106, for example the internet, in exchange for payment.

Generally, network service provider 105 charges mobile user 101 based on the amount of data mobile user 101 uses while accessing network 106. Certain types of content available on network 106 may require more data than other content accessed through network 106. For example, videos, music, and games may use more data than other content. Some of this data-intensive content may be available through a content provider such as content provider 107. Network service provider 105 may wish to provide access to content available from content provider 107 to mobile user 101 without charging mobile user 101 based on the amount of data the content uses. This allows mobile user 101 to access content from content provider 107 by application 121 registered with network service provider 105. By registering application 121 with network service provider 105, network service provider 105 may separately measure data transmitted from content provider 107 to mobile user 101 and account for this data differently than for other data used by mobile user 101 when calculating how much to bill mobile user 101.

Mobile user 101 may use mobile device 102 to access content available through network 106. Mobile user 101 may purchase access to network 106 from network service provider 105. Network service provider 105 may measure the amount of data transmitted to and from network 106 by mobile device 102 in any suitable manner. For example, network service provider 105 may measure the data associated with the IP address or International Mobile Subscriber Identity (IMSI) of mobile device 102. Network service provider 105 may charge mobile user 101 based on the amount of data mobile user 101 uses. Mobile user 101 is charged more if mobile user 101 uses more data, and is charged less if mobile user 101 uses less data, in one embodiment. Mobile user 101 may contract with network service provider 105 to use a set amount of data for a flat fee and network service provider 105 will charge mobile user 105 in addition to the flat fee if mobile user 105 uses more data than mobile user 105 contracted for, in some embodiments. Mobile user 101 may receive a bill 108 periodically from network service provider 105.

Mobile device 102 may be any mobile device such as a cellular phone, smart phone, tablet, laptop, or other electronic communications device connected to a mobile network. Mobile device 102 may also include a user interface, such as a display, a touchscreen, a microphone, keypad, or other appropriate terminal equipment usable by user. Mobile device 102 may communicate wirelessly with base station 104. Mobile device 102 may execute application 121. Application 121 may be any application including a web browser, computer program, mobile "app," or the like for viewing content 109. Content 109 may include webpages, video, music, games, software as a service, advertisements or the like available through network 106. Content 109 may be provided by content provider 107.

Base station 104 may be any base station for use in wireless communications including cellular communications, WiFi, or the like. Base station 104 is coupled to network service provider 105. Network service provider 105 may be any network service provider such as a Wireless Carrier, Internet Service Provider, MAN administrator, WAN administrator, LAN administrator or the like. Network service provider 105 may include one or more computer systems 120 of FIG. 6. For example, network service provider 105 may include a number of components such as servers, proxy servers, mobile gateways, and the like. Network service provider 105 may provide access to network 106.

Network 106 may include any suitable communications network 106 operable to facilitate communication between the components of the system. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Network 106 may additionally include any combination of gateways, routers, hubs, switches, access points, base stations, wireless telephone systems and any other hardware, software or a combination thereof. Network 106 may provide access to content provider 107.

Content provider 107 may provide content 109 such as webpages, video, music, games, software as a service or the like through network 106. Additionally, content provider 107 may provide advertisements as part of content 109. Mobile user may pay content provider 107 in order to access content 109. Content 109 provided by content provider 107 may utilize a large amount of data, in certain embodiments. For example, mobile user 101 may be limited in how much content 109 mobile user 101 can view based on how much network service provider 105 will bill mobile user 101 for using the data needed to view content 109. Content provider 107 may form a relationship 110 with network service provider 105 to allow mobile user 101 to view content 109 without being charged extra for using a large amount of data when viewing content 109. Relationship 110 may be an agreement, contract, partnership or other suitable business arrangement.

Relationship 110 may provide that application 121 is registered to mobile user 101. Upon confirming that application 121 is registered, network service provider 105 may connect application 121 to content provider 107. Network service provider 105 may calculate bill 108 according to how much data application 121 uses to display content 109. Network service provider 105 may calculate the amount of bill 108 using one or more computer systems 120, in a particular embodiment.

In operation, network service provider 105 registers application 121 and establishes connections between application 121 and content provider 107. These connections allow network service provider 105 to measure the data used by application 121 and calculate an amount to bill mobile user 101 based on the data measured. The connections allow network service provider 105 to measure the data used by application 121 separately from the total amount of data used by mobile device 102. Having a separate measurement of the data used by application 121 allows network service provider 105 to take the separate data utilization by application 121 into account when calculating a bill for mobile user 101. This allows network service provider 105 to enable mobile user 101 to view content provided by content provider 107 without charging mobile user 101 for the data utilized by the content.

Figure 2:
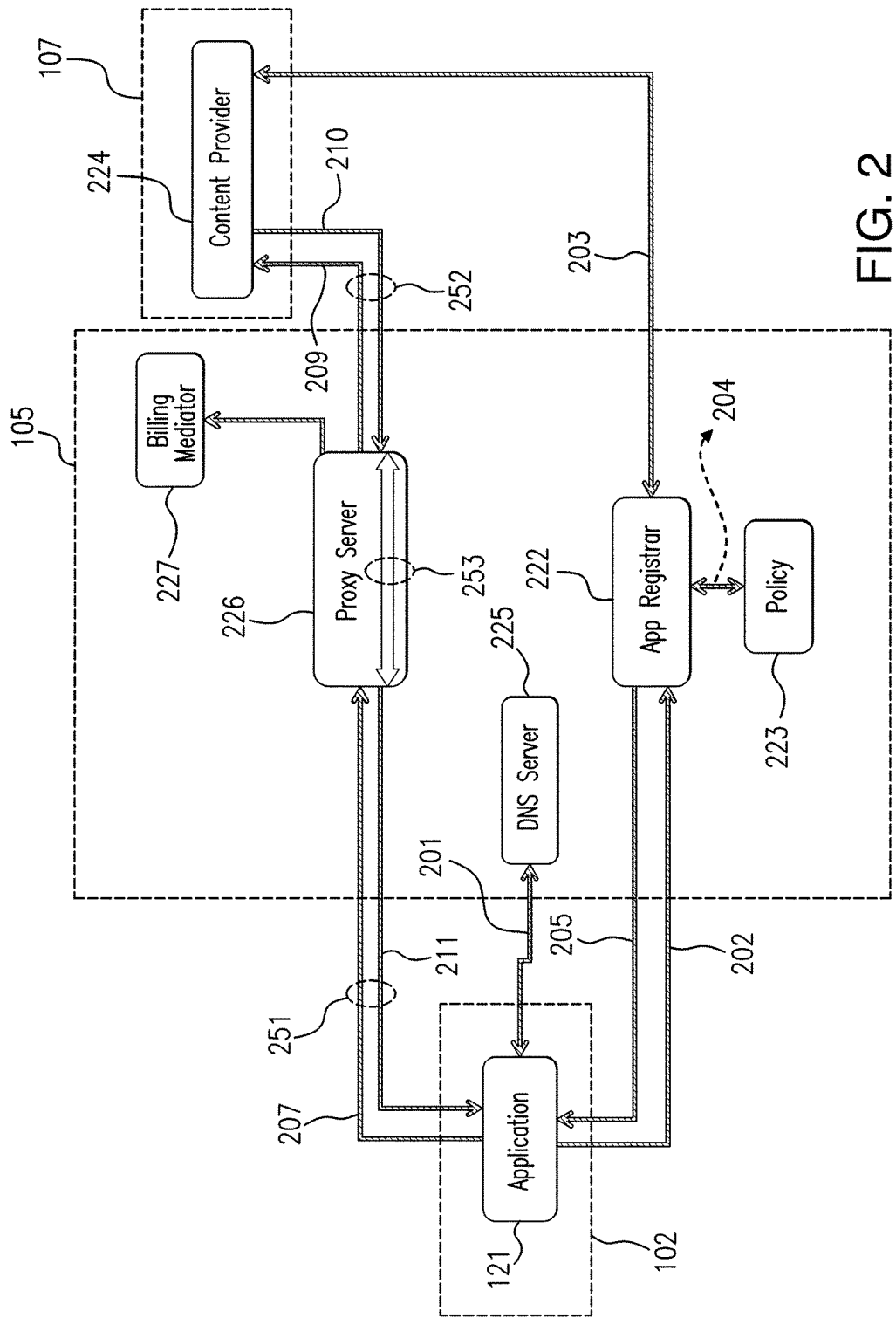
FIG. 2 illustrates a more detailed view of the connections created between the application of FIG. 1 and a content provider of FIG. 1 to measure data used by the application and calculate an amount to bill a mobile user based on the data measured.

FIG. 2 illustrates a more detailed view of the connections (connections 251 and 252) created between application 121 and content provider 107 to measure the data used by application 121 and calculate an amount to bill mobile user 101 based on the data measured. The system of FIG. 2 provides a way for implementing the connections between application 121 and content provider 107 described above with respect to FIG. 1, for example, to calculate bill 108 received by mobile user 101. Illustrated in FIG. 2 is application 121, an application registration server 222, a policy server 223, a content provider 224, a domain name system (DNS) server 225, a proxy server 226, and a billing mediator 227. Application registration server 222, policy server 223, DNS server 225, proxy server 226, and billing mediator 227 may be implemented by network service provider 105 of system 100, in particular embodiments. Content provider 224 may be implemented by content provider 107 of system 100, and application 121 may be implemented on mobile device 102 of system 100, in particular embodiments.

Also shown in FIG. 2 are connections 251 and 252, over which data transmission occurs, including the transmission of content 109, and connections 201, 202, 203, 204, and 205, through which certain information is communicated, as described below. Using connection 201, Application 121 may look up application registration server 222 using DNS server 225. In response, DNS server 225 may return the address of application registration server 222 to application 121. The address of application registration server 222 may be an internet protocol (IP) address. DNS server 225 may cache the address of the application registration server based on a time to live (TTL) of records stored in the DNS server, in a particular embodiment.

Using connection 202, application 121 establishes a session with application registration server 222. Application 121 may establish a transport layer security (TLS) session with application registration server 222, in a particular embodiment. Application registration server 222 may use the session established in connection 202 to register application 121. To register application 121, application registration server 222 may register the application ID of application 121. Application registration sever 222 may also register the IP address and MAC address of application 121 when registering application ID of application 121.

Using connection 203, application registration server 222 communicates the application ID of application 121 to content provider 224. Content provider 224 then authorizes application 121. Authorizing the application ID may ensure that the application ID is not "spoofed," that is, authorizing may prevent a non-authorized application from accessing content provided by content provider 224 without being charged. Using connection 204, application registration server 222 communicates the application ID of application 121 to policy server 223 and receives authorization for the user of application 121. Additionally, policy server 223 may validate the user subscription associated with the application ID communicated using connection 204.

If application registration server 222 receives authorization for application 121 through connections 203 and 204, application registration server 222 may provide application 121 with an application service indicator, a registration key, proxy server information, key index, and an encrypted registration token ($T_{reg}$) through connection 205. Connections 205 and 202 may comprise the same connection or session established between application 121 and application registration server 222, in certain embodiments. The registration key may have a lifetime, in a particular embodiment. The proxy server information may include the IP address and port number of proxy server 226, in a particular embodiment. Application 121 may use the registration key to encrypt an application token ($T_{app}$) when application 121 establishes a connection with proxy server 226. The token may contain the IP address and port information of content provider 224.

Application 121 uses the information received from application registration server 222 to establish a connection 251 with proxy server 226. Connection 251 may use a connection-oriented protocol such as transmission control protocol (TCP), Stream Control Transmission Protocol (SCTP), User Datagram Protocol (UDP), or the like, in particular embodiments. Connection 251 comprises uplink 207 and downlink 211. Application 121 may send an application service header to proxy server 226 using uplink 207 after establishing connection 251. The application service header may be contained inline in an IP packet sent by application 121. The application service header may contain the key index, $T_{reg}$, and $T_{app}$. Proxy server 226, in a particular embodiment, may be a mobile gateway.

Upon receiving the application service header through uplink 207, proxy server 226 uses the key index to decrypt $T_{reg}$ to obtain the registration key, which is used to decrypt $T_{app}$ to obtain the IP address and port information of content provider 224. Decrypting the information received through uplink 207 may consume the application service header, in a particular embodiment.

Proxy server 226 uses the information received in the application service header to establish a connection 252 with content provider 224. Connection 252 may be established through network 106 of FIG. 1, in the illustrated embodiment. Connection 252 may use a connection-oriented protocol such as transmission control protocol (TCP), Stream Control Transmission Protocol (SCTP), User Datagram Protocol (UDP), or the like, in particular embodiments. Connection 252 comprises uplink 209 and downlink 210. Proxy server 226 may pass traffic between connection 251 and 252 at relay 253. Proxy server 226, in particular embodiments, may relay traffic between connections 251 and 252 by adjusting sequence numbers without buffering.

Proxy server 226 may measure the amount of data proxy server 226 relays between connections 251 and 252 for application 121. Proxy server may measure the amount of data it relays between connections 251 and 252 for application 121 based on the application ID, IP address, or International Mobile Subscriber Identity (IMSI), of application 121. Proxy server 226 may pass the amount of data that it has measured to a billing mediator 227. Billing mediator may be a computer having logic to use the measurement of data relayed by proxy server 226 to calculate an amount network service provider 105 should bill user 101. Billing mediator 227, in an alternative embodiment, may be one or more computer programs 150 of FIG. 6 that are executed by proxy server 226. Billing mediator 227 may receive a measurement, made by network service provider 105, of total data or other data used by mobile device 102. Billing mediator 227 may calculate that network service provider 105 should not bill mobile user 101 for data used by application 121. Billing mediator 227, in an alternative embodiment, may calculate that network service provider 105 should bill user 101 a lower amount per unit of data used by application 121, than for other data used by mobile device 102. Billing mediator 227 may subtract the data used by application 121 from a total amount of data used by mobile device 102 for purposes of determining whether user 101 has exceeded a contracted data allowance, in some embodiments.

Thus, by registering application 121, network service provider 105 is able to establish connections 251 and 252 using proxy server 226. Connections 251 and 252 allow network service provider 105 to transmit content 109 from content provider 107 to application 121 while measuring the amount of data content 109 uses. By measuring the amount of data transmitted from content provider 107 to application 121, network service provider can calculate an amount to bill mobile user 101.

Figure 3:
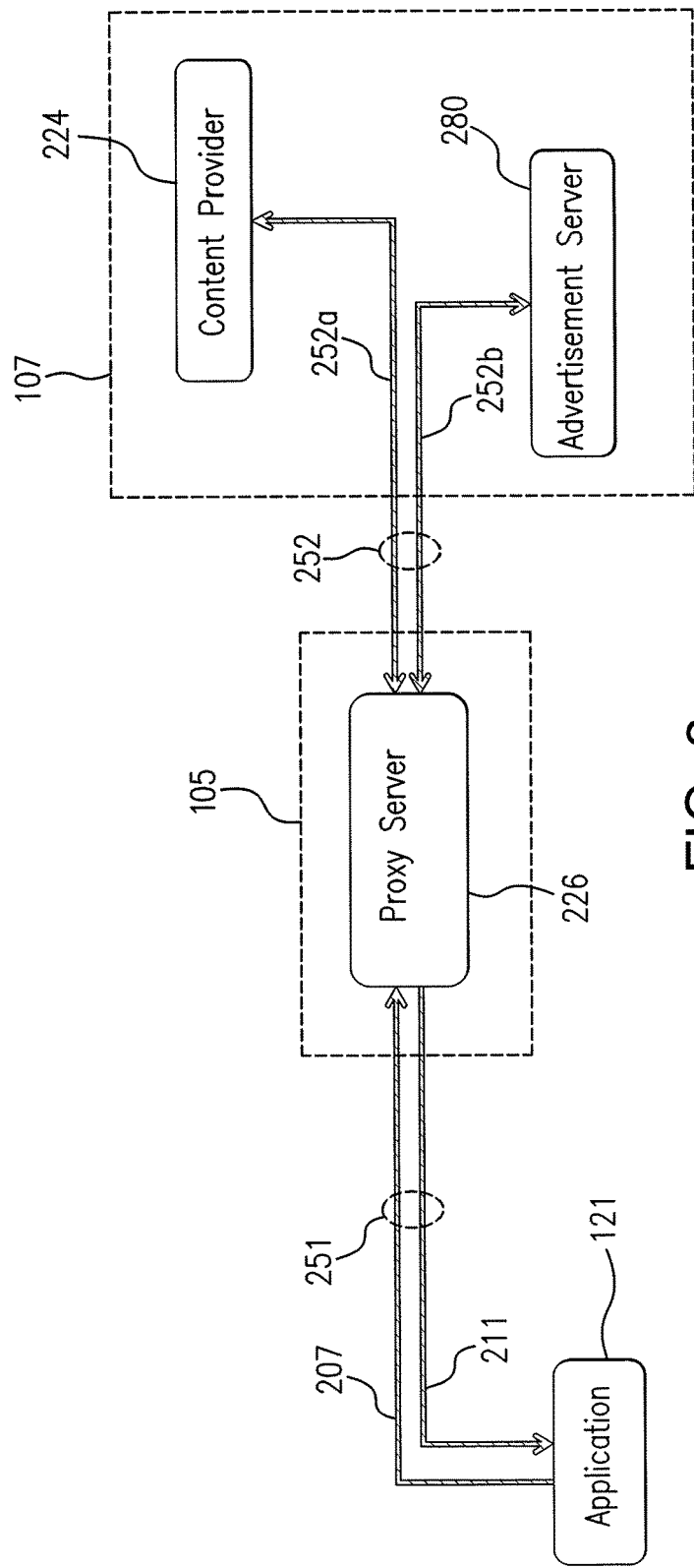
FIG. 3 illustrates an embodiment of the connections of FIG. 2 in which one of the connections comprises multiple connections to separate target endpoints.

FIG. 3 illustrates an embodiment of connections 251 and 252 as shown in FIG. 2 in which connection 252 comprises multiple connections to separate target endpoints. FIG. 3 shows application 121, proxy server 226, content provider 224, advertisement server 280, TCP connection 251, and TCP connection 252. FIG. 3 also shows connections 252a and 252b. Content provider 224 and advertisement server 280 may both be implemented by content provider 107. FIG. 3 illustrates the TCP connections established between application 121 and proxy server 226 and between proxy server 226 and content provider 107.

Figure 4:
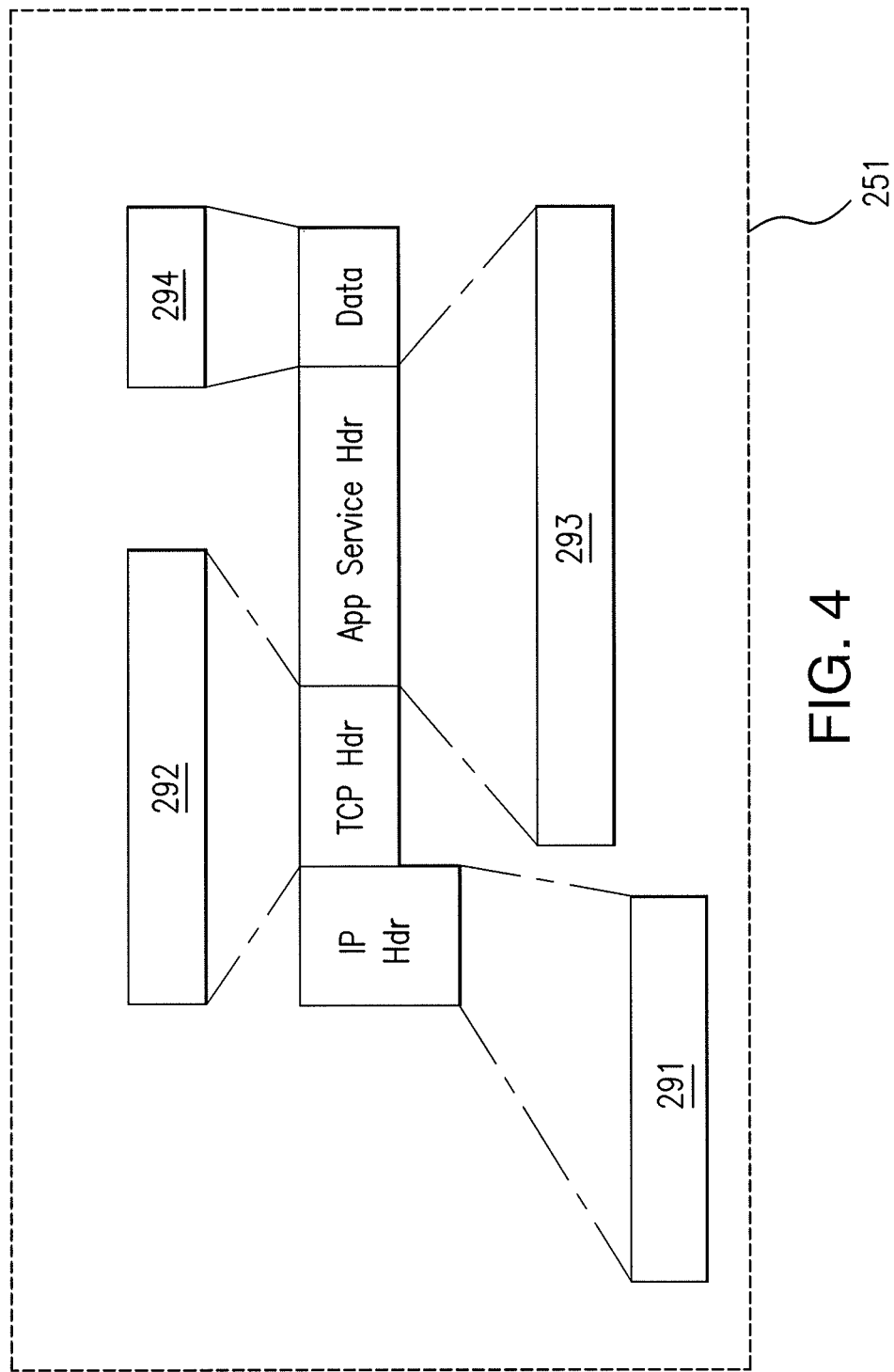
FIG. 4 illustrates an example IP packet containing an application service header that may be transmitted in the connections illustrated in FIGS. 2 and 3.

Upon receiving authorization from application registration server 222 of FIG. 2, application 121 may establish a TCP connection 251 with proxy server 226. To establish the TCP connection, application 121 may send an application service header, as discussed above with regard to FIG. 2, in the initial TCP uplink message. The TCP uplink message may be an IP packet as illustrated in FIG. 4. Transport layer security (TLS) may be established in connection 251 after the initial uplink message is sent from application 121 to proxy server 226.

Proxy server 226 uses the information contained in the application service header to establish TCP connections with the target endpoints. There are two target endpoints, content provider 224 and advertisement server 280, with which proxy server 226 establishes TCP connections 252a and 252b, respectively, in the illustrated embodiment. As discussed above with respect to FIG. 2, Proxy server 226 may relay all messages between TCP connections 251 and 252 after the application service header has been consumed. The relay performed by proxy server 226 between connections 251 and 252 may allow information to pass directly between content provider 224 and advertisement server 280 and application 121. By establishing multiple connections 252 between proxy server 226 and various target endpoints, application 121 may receive content 109 from various sources. This may allow application 121 to receive different types of content, for example, video and advertisements. By relaying all content from the various target endpoints, such as content provider 224 and advertisement server 280, to application 121, proxy server 226 may measure the amount data used by application 121 in viewing various types of content 109 available from various sources.

FIG. 4 illustrates an example IP packet containing an application service header that may be transmitted in connection 251, as illustrated in FIGS. 2 and 3. The IP packet transmitted over connection 251 may contain information used by proxy server 226 to establish connection 252 with content provider 107 and enable proxy server 226 to relay data between connections 252 and 251. The IP packet transmitted in connection 251 comprises IP address 291, TCP header 292, application service header 293, and data 294. IP address 291 may contain a destination IP address for the IP packet transmitted in connection 251, such as the IP address for proxy server 226. TCP header 292 may contain a destination TCP port number for the IP packet transmitted in connection 251, such as the TCP port of proxy server 226.

Application service header 293 may contain information received by application 121 from application registration server 222 that is used by proxy server 226 to establish TCP connections between proxy server 226 and content provider 107. As discussed above, the application service header may contain a key index, an application registration server encrypted token ($T_{reg}$) and an application encrypted token ($T_{app}$). $T_{reg}$ may be encrypted by application registration server 222 using a key that is shared by application registration server 222 and proxy server 226. The key index contained in application service header 293 may be used by proxy server 226 to find the correct shared key to decrypt $T_{reg}$. $T_{reg}$ may contain an application ID, policy ID, registration key, registration timestamp, registration lifetime, application IP address, application registration server nonce, and an application registration server authenticator. The registration key may be used by proxy server 226 to decrypt $T_{app}$. $T_{app}$, in particular embodiments, may contain a target destination IP address, a target destination TCP port number, and application nonce, and application authenticator. The target destination IP address may be the IP address of content provider 224 or advertisement server 280, and the target destination TCP port number may be the TCP port of content provider 224 or advertisement server 280. Application service header 293, in an alternative embodiment, may not contain an application encrypted token because the function of proxy server 226 may be embedded in a mobile gateway. In this case, the IP packet transmitted in connection 251 may already be directed to content provider 224, so no $T_{app}$ is needed with a target destination IP address.

Figure 5:
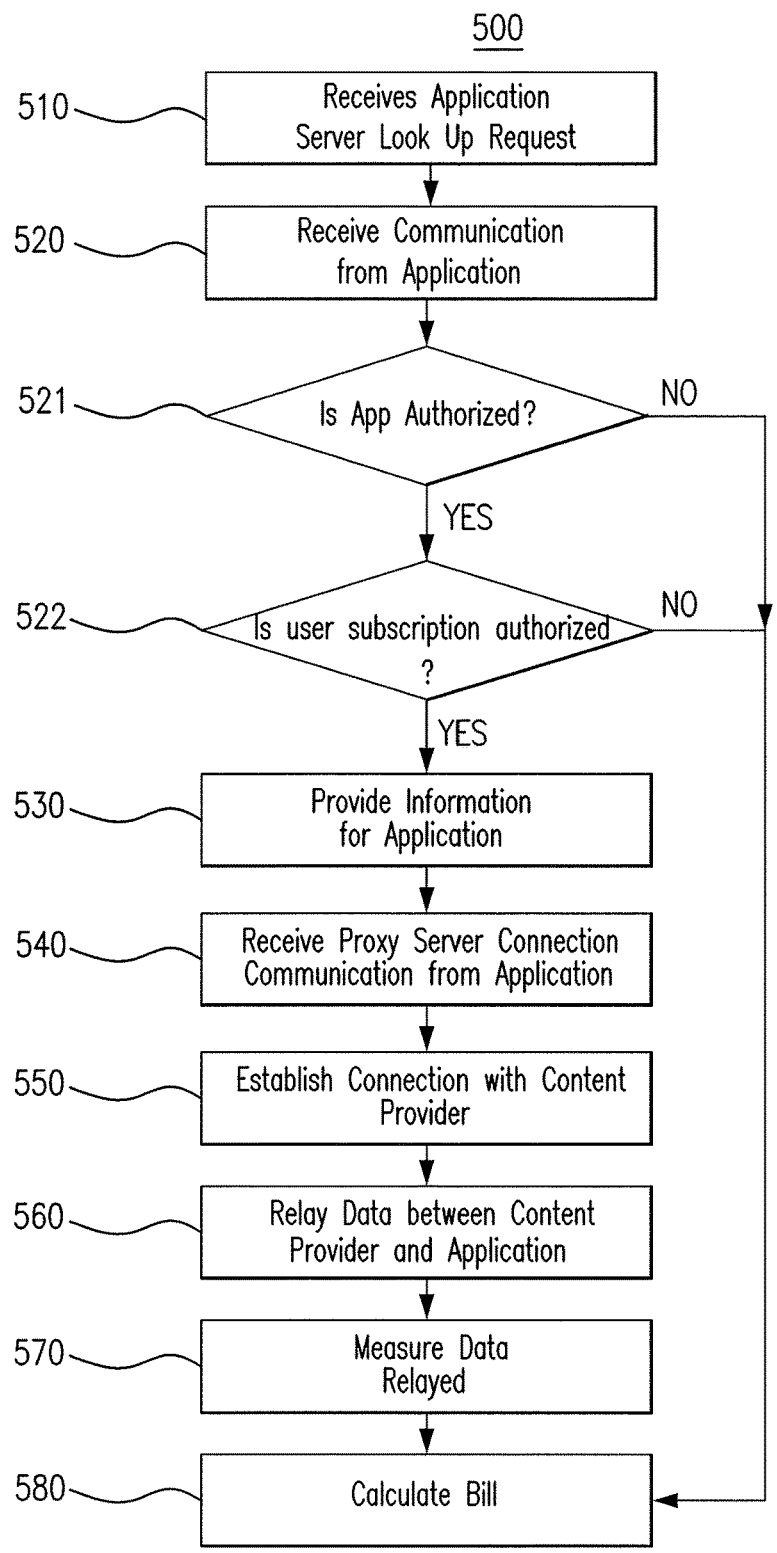
FIG. 5 illustrates an example method for calculating a bill to a mobile user.

FIG. 5 illustrates an example method 500, for calculating a bill to a mobile subscriber. Method 500 may be implemented by network service provider 105 of system 100, in one embodiment. Various steps of method 500 may be implemented by various computer systems 120 of network service provider 105 as illustrated in system 200. Method 500 is described below as though implemented on system 200.

In step 510, DNS server 225 receives a request from application 121 to look up application registration server 222. In response to this request, DNS server 225 may return the address of application registration server 222 to application 121. The address of application registration server 222 may be an IP address.

In step 520, application registration server receives a communication from application 121. Application 121 may establish a transport layer security (TLS) session with application registration server 222. Application registration server 222 may establish a TLS session with application 121 in response to the communication received from application 121, in an alternative embodiment. Application registration server 222 may use the session established using connection 202 to register application 121. To register application 121, application registration server 222 may register the application ID of application 121. Application registration sever 222 may also register the IP address and MAC address of application 121 when registering application ID of application 121.

In step 521, application registration server 222 determines if application 121 is authorized. Application registration server 222 communicates the application ID to content provider 224. If the application ID is authorized by content provider 224, application registration server 222 will authorize application 121. Authorizing the application ID may ensure that the application ID is not "spoofed," that is, authorizing may prevent a non-authorized application from accessing content provided by content provider 224 without being charged.

If application registration server 222 authorized application 121 at step 521, then application registration server 222 determines if the user subscription for application 121 is authorized in step 522. Application registration server 222 communicates the application ID to policy server 223 and receives authorization for the user of application 121. Policy server 223 may also validate the user subscription associated with the application ID communicated by application 121.

If application registration server 222 receives authorization for application 121 in step 522, then application registration server provides application 121 with an application service indicator, a registration key, proxy server information, key index, and an encrypted token ($T_{reg}$) in step 530. The proxy server information may include the IP address and port number of proxy server 226.

In step 540, proxy server 226 receives a communication from application 121 to establish a connection with application 121. Application 121 may use the registration key to encrypt a token ($T_{app}$) when application 121 establishes a connection with proxy server 226. The token may contain the IP address and port information of content service provider 224. Connection 251 may comprise uplink 207 and downlink 211. Application 121 may send an application service header to proxy server 226 through uplink 207 after establishing connection 251 in step 540. The application service header may contain the key index, $T_{reg}$, and $T_{app}$.

In step 550, proxy server 226 uses the information received in the application service header to establish a connection 252 with content provider 224. Proxy server 226 uses the key index contained in the application service header to decrypt $T_{reg}$ to obtain the registration key, which is used to decrypt $T_{app}$ to obtain the IP address and port information of content provider 224. Proxy server 226 then uses this information to establish a connection 252 with content provider 224. Decrypting the information received in step 550 may consume the application service header.

In step 560, proxy server 226 relays data from content provider 224 to application 121. Proxy server 226 may pass traffic between connection 251 and 252 at relay 253.

In step 570, proxy server 226 measures the amount of data application 121 receives that proxy server 226 relays between connections 251 and 252. Proxy server 226 may measure the amount of data application 121 receives based on the application ID, IP address, or International Mobile Subscriber Identity (IMSI) of application 121. After accounting for the data application 121 receives, proxy server 226 may pass the measurement to a billing mediator 227.

In step 580, billing mediator 227 uses the measurement of the amount data application 121 received to calculate the amount network service provider 105 should bill user 101. Billing mediator 227 may receive a measurement of total data or other data used by mobile device 102 made by network service provider 105. Billing mediator 227 may calculate that network service provider 105 should not bill user 101 for data used by application 121. Billing mediator 227, in an alternative embodiment, may calculate that network service provider 105 should bill user 101 a lower amount per unit of data used by application 121, than for other data used by mobile device 102. Billing mediator 227 may subtract the data used by application 121 from a total amount of data used by mobile device 102 for purposes of determining whether user 101 has exceeded a contracted data allowance, in some embodiments.

Figure 6:
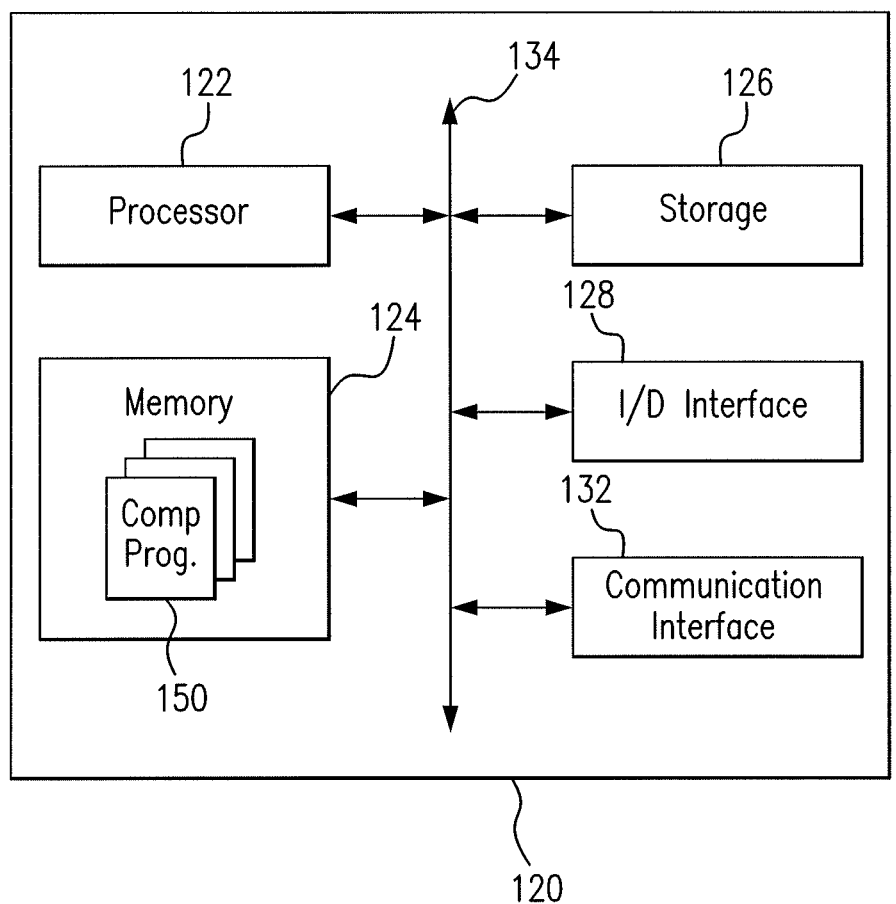
FIG. 6 illustrates computer system that may perform one or more steps of the methods described herein.

FIG. 6 illustrates additional details computer system 120, which may perform one or more steps of the methods described herein. Network service provider 105 and content provider 107 of FIG. 1 may include one or more computer systems 120. Computer system 120 may include a processor 122, a memory 124, a storage 126, an input/output (I/O) interface 128, a communication interface 132, and a bus 134. Although this disclosure describes and illustrates a particular computer system having a particular number of particular components in a particular arrangement, this disclosure contemplates any suitable computer system having any suitable number of any suitable components in any suitable arrangement.

Processor 122 may include hardware for executing instructions, such as those making up a computer program 150. As an example and not by way of limitation, to execute instructions, processor 122 may retrieve (or fetch) the instructions from an internal register, an internal cache, memory 124, or storage 126; decode and execute the instructions; and then write one or more results to an internal register, an internal cache, memory 124, or storage 126. Processor 122 may include one or more internal caches for data, instructions, or addresses, in particular embodiments. This disclosure contemplates processor 122 including any suitable number of any suitable internal caches, where appropriate. As an example and not by way of limitation, processor 122 may include one or more instruction caches, one or more data caches, and one or more translation lookaside buffers (TLBs). Instructions in the instruction caches may be copies of instructions in memory 124 or storage 126, and the instruction caches may speed up retrieval of those instructions by processor 122. Data in the data caches may be copies of data in memory 124 or storage 126 for instructions executing at processor 122 to operate on; the results of previous instructions executed at processor 122 for access by subsequent instructions executing at processor 122 or for writing to memory 124 or storage 126; or other suitable data. The data caches may speed up read or write operations by processor 122. The TLBs may speed up virtual-address translation for processor 122. Processor 122 may include one or more internal registers for data, instructions, or addresses, in particular embodiments. This disclosure contemplates processor 122 including any suitable number of any suitable internal registers, where appropriate. Where appropriate, processor 122 may include one or more arithmetic logic units (ALUs); be a multi-core processor; or include one or more processors 122. Although this disclosure describes and illustrates a particular processor, this disclosure contemplates any suitable processor.

Memory 126 may include main memory for storing instructions such as computer program(s) 150 for processor 122 to execute, or data for processor 122 to operate on. As an example and not by way of limitation, computer system 120 may load instructions from storage 126 or another source (e.g., another computer system 120) to memory 124. Processor 122 may then load the instructions from memory 124 to an internal register or internal cache. To execute the instructions, processor 122 may retrieve the instructions from the internal register or internal cache and decode them. During or after execution of the instructions, processor 122 may write one or more results (which may be intermediate or final results) to the internal register or internal cache. Processor 122 may then write one or more of those results to memory 124. Processor 122 executes only instructions in one or more internal registers or internal caches or in memory 124 (as opposed to storage 126 or elsewhere) and operates only on data in one or more internal registers or internal caches or in memory 124 (as opposed to storage 126 or elsewhere), in particular embodiments. One or more memory buses (which may each include an address bus and a data bus) may couple processor 122 to memory 124. Bus 134 may include one or more memory buses, as described below. One or more memory management units (MMUs) reside between processor 122 and memory 124 and facilitate accesses to memory 124 requested by processor 122, in particular embodiments.

Instructions executed by processor 122, in particular embodiments, may reside in one or more computer programs 150. Computer program 150 generally refers to instructions, logic, rules, algorithms, code, tables, or other suitable instructions for performing the described functions and operations. Computer programs 150 may be stored in memory 124, storage 126, or any other location accessible to computer system 120. Where appropriate, computer program 150 may include one or more computer programs 150; be unitary or distributed; span multiple locations; span multiple machines; or reside in a cloud.

Storage 126 may include mass storage for data or instructions such as computer program 150. As an example and not by way of limitation, storage 126 may include an HDD, a floppy disk drive, flash memory, an optical disc, a magneto-optical disc, magnetic tape, a Universal Serial Bus (USB) drive, a solid-state drive (SSD), or a combination of two or more of these. Storage 126 may include removable or non-removable (or fixed) media, where appropriate. Storage 126 may be internal or external to computer system 120, where appropriate. Storage 126 is non-volatile, solid-state memory, in particular embodiments. Storage 126 includes read-only memory (ROM), in particular embodiments. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates storage 126 taking any suitable physical form. Storage 126 may include one or more storage control units facilitating communication between processor 122 and storage 126, where appropriate. Where appropriate, storage 126 may include one or more storage devices 126. Although this disclosure describes and illustrates particular storage, this disclosure contemplates any suitable storage.

I/O interface 128 may include hardware, software, or both providing one or more interfaces for communication between computer system 120 and one or more I/O devices. System 100 may include one or more of these I/O devices, where appropriate. One or more of these I/O devices may enable communication between a person and computer system 120. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 128 for them. Where appropriate, I/O interface 128 may include one or more device or software drivers enabling processor 122 to drive one or more of these I/O devices. I/O interface 128 may include one or more I/O interfaces 128, where appropriate. Although this disclosure describes and illustrates a particular I/O interface, this disclosure contemplates any suitable I/O interface.

Communication interface 132 may include hardware, software, or both providing one or more interfaces for communication (e.g., packet-based communication) between computer system 120 and one or more other computer systems 120 or one or more networks. As an example and not by way of limitation, communication interface 132 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 132 for it. As an example and not by way of limitation, computer system 120 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 120 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computer system 120 may include any suitable communication interface 132 for any of these networks, where appropriate. Communication interface 132 may include one or more communication interfaces 132, where appropriate. Although this disclosure describes and illustrates a particular communication interface, this disclosure contemplates any suitable communication interface.

Bus 134 may include hardware, software, or both coupling components of computer system 120 to each other. As an example and not by way of limitation, bus 134 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 134 may include one or more buses 134, where appropriate. Although this disclosure describes and illustrates a particular bus, this disclosure contemplates any suitable bus or interconnect.

This disclosure contemplates any suitable number of computer systems 120. Computer system 120 may take any suitable physical form. As example and not by way of limitation, computer system 120 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, a proxy server, a mobile gateway or a combination of two or more of these. Computer system 20 may be unitary or distributed; span multiple locations; span multiple machines; or reside in a cloud, which may include one or more cloud components in one or more networks. Where appropriate, one or more computer systems 120 may perform without substantial spatial or temporal limitation one or more steps of one or more methods described or illustrated herein. As an example and not by way of limitation, one or more computer systems 120 may perform in real time or in batch mode one or more steps of one or more methods described or illustrated herein. One or more computer systems 120 may perform at different times or at different locations one or more steps of one or more methods described or illustrated herein, where appropriate.

Computer system 120, in some embodiments, may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, computer system 120 may be a web server running web server applications such as Apache, Microsoft's Internet Information Server™, and the like. Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A method for measuring data utilization attributable to use by an application being executed on a mobile device comprising:
   at an application server:
      registering the application with the application server;
   at the application:
      receiving, from the application server, a proxy server IP address, a proxy server port number, a registration key, a key index, and an encrypted registration token;
      encrypting an application token using the registration key;
      transmitting the proxy server IP address, the proxy server port number, the key index, the encrypted application token, and the encrypted registration token to a proxy server;
      establishing a first connection between the application and the proxy server;
   at the proxy server:
      decrypting the encrypted registration token using the key index to obtain the registration key;
      decrypting the encrypted application token using the registration key;
      obtaining a content provider IP address and content provider information from the decrypted application token;
      establishing a second connection between the proxy server and the target endpoint using the content provider IP address and the content provider information;

passing data between the target endpoint and the application through the proxy server using the established connections; and measuring the amount of data passed between the target endpoint and the application.

2. The method of claim 1, wherein registering the application comprises authorizing the application and an application subscription.

3. The method of claim 1, wherein transmitting the proxy server IP address, the proxy server port number, the key index, the encrypted application token, and the encrypted registration token comprises transmitting a header.

4. The method of claim 3, wherein the header is received in line with traffic received by the proxy server.

5. The method of claim 1, wherein the proxy server is a mobile gateway.

6. The method of claim 1, wherein the first and second connections are TCP connections.

7. Non transitory computer readable media having stored thereon instructions that, when executed:

at a server, further cause the server to:
register an application being executed on a mobile device;
transmit, to the application, a proxy server IP address, a proxy server port number, a registration key, a key index, and an encrypted registration token;

at the mobile device, further cause the mobile device to:
encrypt an application token using the registration key;
establish a first connection with a proxy server;

at the proxy server, further cause the proxy server to:
receive the proxy server IP address, the proxy server port number, the key index, the encrypted application token, and the encrypted registration token;
decrypt the encrypted registration token using the key index to obtain the registration key;
decrypt the encrypted application token using the registration key;
obtain a content provider IP address and content provider information from the decrypted application token;
establish a first connection with the application;
establish a second connection between the proxy server and the target endpoint using the content provider IP address and the content provider information;
pass data between the target endpoint and the application through the proxy server using the established connections; and
measure the amount of data passed between the target endpoint and the application.

8. The computer-readable medium of claim 7, wherein the instructions causing the computer to register the application cause the computer to authorize the application and an application subscription.

9. The computer-readable medium of claim 7, wherein receiving the proxy server IP address, the proxy server port number, the key index, the encrypted application token, and the encrypted registration token comprises receiving a header.

10. The computer-readable medium of claim 9, wherein the header is received in line with traffic received by the proxy server.

11. The computer-readable medium of claim 7, wherein the proxy server is a mobile gateway.

12. The computer-readable medium of claim 7, wherein the first and second connections are TCP connections.

13. A system for measuring data utilization attributable to use by an application being executed on a mobile device comprising:

a server operable to:
register the application
transmit, to the application, a proxy server IP address, a proxy server port number, a registration key, a key index, and an encrypted registration token;

the application operable to:
encrypt an application token using the registration key;
establish a first connection with a proxy server;

the proxy server operable to:
receive the proxy server IP address, the proxy server port number, the key index, the encrypted application token, and the encrypted registration token;
decrypt the encrypted registration token using the key index to obtain the registration key;
decrypt the encrypted application token using the registration key;
obtain a content provider IP address and content provider information from the decrypted application token;
establish a second connection between the proxy server and the target endpoint using the content provider IP address and content provider information;
pass data between the target endpoint and the application using the established connections; and
measure the amount of data passed between the target endpoint and the application.

14. The system of claim 13, wherein registering the application comprises authorizing the application and an application subscription.

15. The system of claim 13, wherein receiving the proxy server IP address, the proxy server port number, the key index, the encrypted application token, and the encrypted registration token comprises receiving a header.

16. The system of claim 15, wherein the header is received in line with traffic received by the proxy server.

17. The system of claim 13, wherein the proxy server is a mobile gateway.

18. The system of claim 13, wherein the first and second connections are TCP connections.

* * * * *